United States Patent
Jeon et al.

(10) Patent No.: US 8,245,312 B2
(45) Date of Patent: Aug. 14, 2012

(54) METHOD AND APPARATUS FOR DIGITAL RIGHTS MANAGEMENT

(75) Inventors: Hong-young Jeon, Suwon-si (KR); Myung-june Jung, Suwon-si (KR); Hyun-jin Choi, Suwon-si (KR); Kyung-im Jung, Seongnam-si (KR); Ji-soo Kim, Yongin-si (KR); Sun-jae Lee, Suwon-si (KR); Eok-soo Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 909 days.

(21) Appl. No.: 11/829,421

(22) Filed: Jul. 27, 2007

(65) Prior Publication Data
US 2008/0104713 A1   May 1, 2008

(30) Foreign Application Priority Data
Oct. 31, 2006  (KR) .................. 10-2006-0106835

(51) Int. Cl.
  H04L 29/06  (2006.01)
  G06F 7/04   (2006.01)
  G06F 17/30  (2006.01)
  G06F 21/00  (2006.01)
  H04N 7/16   (2011.01)
  G06Q 20/00  (2012.01)
(52) U.S. Cl. ................ 726/30; 726/5; 726/26; 713/169; 705/51; 705/59; 705/75
(58) Field of Classification Search .................. None
See application file for complete search history.

(56) References Cited

U.S. PATENT DOCUMENTS

| | | | |
|---|---|---|---|
| 2003/0069904 A1* | 4/2003 | Hsu et al. ................ 707/204 |
| 2004/0102987 A1  | 5/2004 | Takahashi et al. |
| 2004/0111373 A1* | 6/2004 | Iga ..................... 705/51 |
| 2004/0172561 A1* | 9/2004 | Iga ..................... 713/201 |
| 2004/0193919 A1  | 9/2004 | Dabbish et al. |
| 2004/0196981 A1* | 10/2004 | Nakano et al. ............ 380/280 |
| 2006/0036554 A1* | 2/2006 | Schrock et al. ............ 705/75 |
| 2006/0085354 A1* | 4/2006 | Hirai .................... 705/59 |
| 2006/0271484 A1* | 11/2006 | Stefik et al. ............. 705/51 |
| 2007/0061725 A1* | 3/2007 | Isaac et al. .............. 715/717 |
| 2007/0219917 A1* | 9/2007 | Liu et al. ................ 705/59 |
| 2008/0010457 A1* | 1/2008 | Lee et al. ................ 713/169 |

(Continued)

FOREIGN PATENT DOCUMENTS

JP   2004-164299 A   6/2004

(Continued)

OTHER PUBLICATIONS

Communication issued Dec. 7, 2010 in counterpart Japanese Application No. 2007-239799.

(Continued)

*Primary Examiner* — Shin-Hon Chen
(74) *Attorney, Agent, or Firm* — Sughrue Mion, PLLC

(57) ABSTRACT

A method of managing the digital rights of a remote device is disclosed. The method includes receiving a warrant including information that the use of content is allowed, issued from a main device having the replay right for the content, transmitting the warrant to a service-providing device, and receiving the content provided by the service-providing device.

44 Claims, 7 Drawing Sheets

U.S. PATENT DOCUMENTS

2008/0104706 A1* 5/2008 Karp et al. .................. 726/26
2008/0109882 A1* 5/2008 Mahalal et al. ................ 726/5

FOREIGN PATENT DOCUMENTS

| | | |
|---|---|---|
| JP | 2004-334860 A | 11/2004 |
| JP | 2005-64791 A | 3/2005 |
| JP | 2006-277813 A | 10/2006 |
| JP | 2006-285974 A | 10/2006 |
| KR | 10-2005-0045883 A | 5/2005 |
| KR | 10-2005-0092216 A | 9/2005 |
| KR | 1020050096040 A | 10/2005 |

OTHER PUBLICATIONS

Communication from the State Intellectual Property Office of P.R. China dated Jul. 5, 2011, in counterpart Chinese Application No. 200710167552.1.

* cited by examiner

METHOD AND APPARATUS FOR DIGITAL RIGHTS MANAGEMENT

CROSS-REFERENCE TO RELATED APPLICATION

This application is based on and claims priority from Korean Patent Application No. 10-2006-0106835 filed on Oct. 31, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to digital rights management, and more particularly, to digital rights management in which a user can use purchased content flexibly regardless of device while safely protecting digital rights.

2. Description of the Related Art

Research on digital rights management (DRM) is being actively conducted, and commercial services using DRM have been introduced and are being prepared to be introduced. DRM is a technological concept for protecting digital content which can be easily copied and distributed.

There have been efforts to protect digital content, but related art technologies have focused on preventing unauthorized access to digital content. For example, access to digital content has been allowed only to users who paid for the content. However, digital content can be easily re-used, processed, copied, and distributed. Hence, when a paying user copies and distributes the content without permission, users who did not pay for the content can use the digital content.

In order to solve this problem, digital content needs to be encrypted before being distributed, and there should be a license, called a Rights Object (RO), in order to use the encrypted digital content. Hence, a device intending to use content should store the RO, or communicate with another device having the RO. Further, if the RO exists with content in an integrated form, the content cannot be used by other devices exempting the device storing the content. Content and ROs can be copied and moved between devices, but there are constraints for copying and moving (for example, moving more than a predetermined number of times can be prohibited).

Korean Unexamined Patent 10-2005-0045883 (Content-Sharing System, Content-Processing Device, Information-Processing Device, Program, Recording Medium, and Content-Sharing Method) discloses a technology that can share content between devices while protecting digital rights by adding the source ID, which specifies a device that provides content, to the content, and by providing a device having a replay-permission-ID list that includes the source ID added to the content. However, according to Korean Unexamined Patent 10-2005-0045883, content should be directly transmitted between devices in order to share content. Hence, movability of content can be restrained depending on the storage capacity of a device receiving content, and content cannot be shared between devices that cannot communicate with each other, both of which are problems.

Therefore, there is a need for a technology, by which a user can use purchased content flexibly regardless of the device while safely protecting digital rights.

SUMMARY OF THE INVENTION

An object of the present invention is to flexibly use content protected by digital rights management.

The present invention will not be limited to the technical objects described above. Other objects not described herein will be more definitely understood by those in the art from the following detailed description.

According to an exemplary embodiment of the present invention, there is provided a method of managing digital rights of a remote device, the method including receiving a warrant including information that the use of content is allowed, issued from a main device having the replay right for the content, transmitting the warrant to a service-providing device, and receiving the content provided from the service-providing device.

According to an exemplary embodiment of the present invention, there is provided a method of managing digital rights of a main device having the replay right, the method including issuing a warrant including information indicating that the use of the content is allowed, to a remote device, receiving a request to update state information of an RO that can replay the content, from a service-providing device intending to provide the content to the remote device, and updating the state information.

According to an exemplary embodiment of the present invention, there is provided a method of managing digital rights of a service-providing device, the method including receiving a warrant and a request for content transmission from a remote device, verifying that the warrant is issued by a main device, and providing the content to the remote device in the case where the warrant is issued by the main device.

According to an exemplary embodiment of the present invention, there is provided a remote device for managing digital rights, the device including a request unit that sends a request for content to a service-providing device using a warrant including information indicating that the use of the content is allowed from a main device having the replay right, and replaying the content provided from the service-providing device.

According to an exemplary embodiment of the present invention, there is provided a main device having the replay right, the device including a warrant-generating unit that generates a warrant including information indicating that the use of the content is allowed, a communication unit that transmits the generated warrant to a remote device, and a control unit that updates state information after receiving a request to update the state information of a rights object, from a service-providing device intending to provide the content to the remote device.

According to an exemplary embodiment of the present invention, there is provided a service-providing device for managing digital rights, the device including a warrant-verifying unit that verifies that a warrant has been issued by a main device in the case where a request for transmission of the warrant and content has been received from the remote device, and a content-providing unit that provides the content to the remote device in the case where the warrant has been issued by the main device.

BRIEF DESCRIPTION OF THE DRAWINGS

The above and other features and aspects of the present invention will become apparent by describing in detail exemplary embodiments thereof with reference to the attached drawings in which.

DETAILED DESCRIPTION OF THE INVENTION

Figure 1:
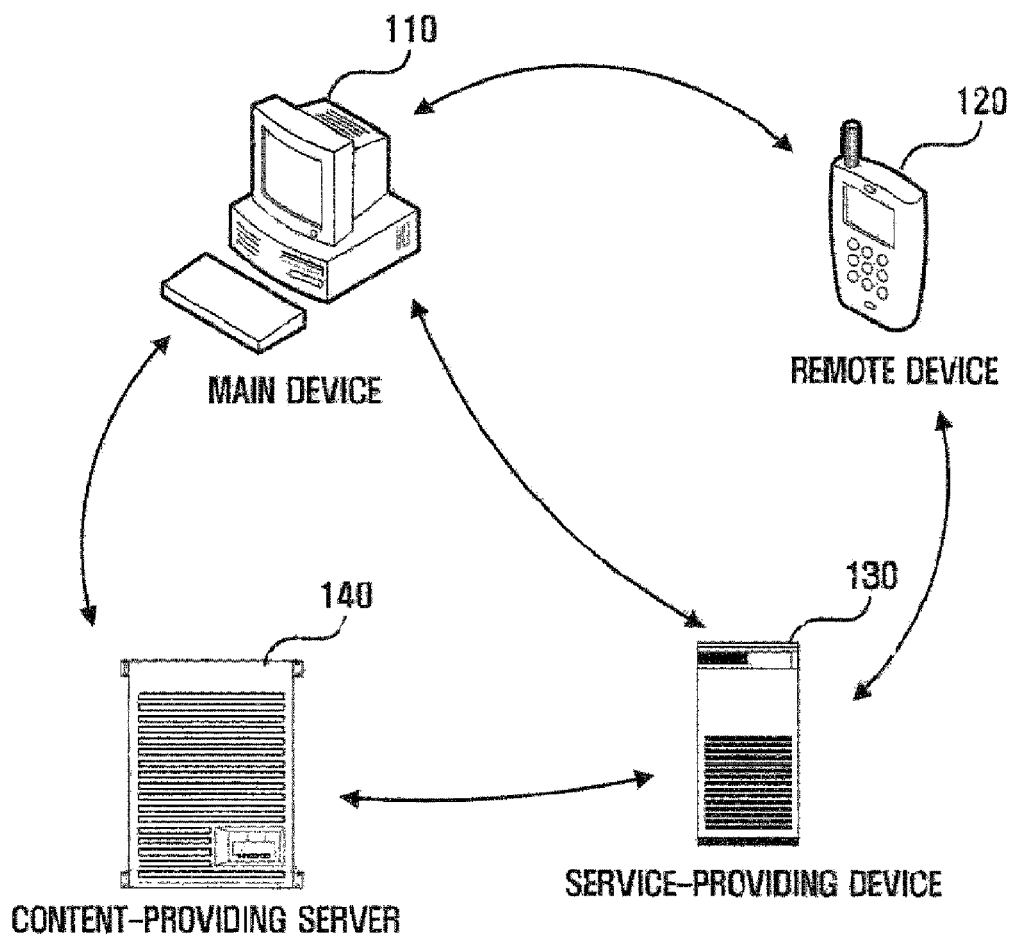
FIG. 1 illustrates a DRM system according to an exemplary embodiment of the present invention.

Exemplary embodiments of the present invention will be described in detail with reference to the accompanying drawings.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will convey the concept of the invention to those skilled in the art, and the present invention will only be defined by the appended claims. Like reference numerals refer to like elements throughout the specification.

First, terms used in the present invention are briefly described. The description on the terms is to aid in understanding the present invention. Hence, unless a certain term is clearly stated in a limited manner, the description on the terms below should not limit the technological concept of the present invention.

Content

Here, an example of the content is digital multimedia data, and the content is not limited to moving pictures, images, games, text, and so on. The content may exist in an encrypted state.

Rights Object (RO)

A rights object is license defining the rights of content use. The RO includes a content-encryption key, constraint information, and a content identifier. Here, the content identifier is information that is used for identifying content that can replay content using the content-encryption key.

Content-Encryption Key

A content encryption key may have a binary value in a predetermined format. For example, the content encryption key can be used in acquiring original content by decrypting a content object.

Constraint Information

Constraint information indicates a limit that can play back content, and one or more sets of information can be set within one rights object. Some examples of the constraint information are a count constraint, a date-time constraint, an interval constraint, and an accumulated-time constraint.

Here, the count constraint specifies how many times a content object can be played back. For example, if the count restraint of the RO is set as 10, the host device can play back the content object 10 times by using the RO.

The date-time constraint limits the date and the time when the content object can be played back, and can include at least one among a start element and an end element. In the case where the date-time constraint consumes the set RO, the host device can play back the content object after the date and the time indicated by the start element, and can play back the content object until the date and the time indicated by the end element.

The interval constraint limits the period when a content object can be played back by using an RO from the point of time when the content object is played back for the first time. For example, in the case where the period constraint is set as 1 week, if the host device plays back the content object by using an RO for the first time at XX:XX:XX, Dec. 1, 2006, the host device can play back the content object by using the RO until XX:XX:XX, Dec. 8, 2006.

The accumulated time constraint limits the total sum of hours for which the content object can be played back by using the RO. For example, if the accumulated time constraint is set as 10 hours, the host device can play back the content object for 10 hours by using the RO. Here, the host device is not limited to the predetermined number content uses or the date of the playback of the content object by using the RO.

State Information

The state information indicates the consumption level of an RO. For example, in the case where the constraint information of the RO is set as 10, and the host device has used the RO for 4 hours, the state information indicates the information on how many hours (4 hours) the host device has used the RO or how many hours (6 hours) the host device will use the content object by using the RO. The state information can be included in the rights object, or can be managed as separate information along with the RO by the device that stores the RO.

Public-Key Cryptography

This is also referred to as asymmetric cryptography because encryption is made when a key used in decrypting data and a key used in encrypting the data constitute different encryption keys. In public-key cryptography, an encryption key consists of a public key and a private key pair. It is not necessary to keep the public key secret, i.e., the public is easily accessible thereto while the private key must be known only to a specific device. This public key encryption algorithm is disclosed to the general public but it is difficult for a third person to discover the original content using the encryption algorithm, encryption key and ciphered text. Examples of public key encryption algorithms include Diffie-Hellman, RSA, El Gamal, and Elliptic Curve.

Symmetric-Key Cryptography

This is also referred to as secret-key cryptography, wherein encryption is made when a key used to encrypt data and a key used to decrypt the data constitute the same encryption key. As an example of such symmetric key encryption, the data encryption standard (DES) algorithm is most common, but the number of applications adopting the advanced encryption standard (AES) has increased recently.

Random Number

A random number is a sequence of numbers or characters with random properties. Since it is computationally complex to generate a complete random number, a pseudo-random number may be used.

Certificate

A certificate includes information that can confirm that a certain device is valid. For example, a certificate can include an identifier and a public key of a certain device. Further, the certificate is issued and electronically signed by a predetermined certification authority. A device can confirm that the counterpart device is valid through the certificate of the counterpart device.

Warrant

A warrant includes information on whether a device allows another device to use part or all of its content replay rights.

This means that the device stores a valid, executable rights object for executing content, or content integrated with the rights object.

Terms not defined above will be described below when necessary.

FIG. 1 illustrates a DRM system 100 according to an exemplary embodiment of the present invention. The illustrated DRM system 100 includes a main device 110, a remote device 120, a service-providing device 130, and a content-providing server 140.

The main device 110 can communicate in a wired or wireless manner, and includes a storage medium such as a flash memory or a hard-disk drive. Hence, the main device 110 can transmit content or the ROs to other devices, or receive content and ROs from other devices and store them. The main device 110 can replay content by using ROs. Further, the main device 110 can issue a warrant to the remote device 120. Some examples of the main device 110 are a personal computer, a notebook computer, a set-top box, a TV, and a personal video recorder.

The remote device 120 can communicate in a wired or wireless manner, and replay content. According to an exemplary embodiment of the present invention, the remote device 120 can replay content corresponding to the replay right held by the remote device 120 after a predetermined procedure even though the remote device 120 does not directly store content and ROs. For this, the remote device 120 can use a warrant issued by the main device 110. Some examples of the remote device 120 are a mobile phone, a PDA, a PMP, and an MP3 player, but the present invention is not limited to the devices.

The content-providing server 140 provides content or ROs. If content and ROs exist as independent objects, the ROs can be provided to devices that have paid a certain price, and the content can be provided in an encrypted state without compensation because ROs are necessary to replay encrypted content. If the ROs are integrated with content, the content-providing server 140 can provide content to the device that has paid a certain price. Further, content and ROs can be provided by separate bodies.

The service-providing device 130 can provide content, the replay rights of which belong to the main device 110, to the remote device 120. For this, the service-providing device 130 can directly store content, or can receive content transmitted from the content-providing server 140, and provide the received content to the remote device 140. The content provided to the remote device 120 can be in a state where the content can be replayed without an RO. Further, a predetermined security work can be performed by the service-providing device 130 in order to prevent the situation where content transmitted to the remote device 120 is opened to other devices.

Necessary data can be exchanged between the main device 110 and the remote device 120 based on protocols for the LAN, such as the Bluetooth, wireless LAN, USB, and IEEE, and protocols for WAN, based on the xDSL, a telephone wire or an optical cable, can be used for communication between the remaining devices in the DRM system 100. The present invention is not limited the protocols, and communication protocols can be changed depending on the situation.

For example, after a user purchases an RO or content from the content-providing server 140 using the main device 110 at home, he can store a warrant generated by the main device 110 by connecting the main device 110 and the remote device 120, in the remote device 120. Here, the user carrying the remote device 120 can send a request for content corresponding to the replay rights of the main device to the service-providing device 130. Here, after a predetermined procedure, the service-providing device 130 can provide content to the remote device 120, and the user can use content through the remote device 120. That is, the user can replay necessary content using the remote device 120 even though content or the RO purchased through the main device 110 is not moved to the remote device 120.

Further, the content-providing server 140 and the service-providing device 130 are described as separate devices in FIG. 1, but the content-providing server 140 and the service-providing device 130 can be the same device.

The operation process between devices of the DRM system 100, and the constitution of each device are described in more detail in the following.

The main device 110, the remote device 120, the service-providing device 130, and the content-providing server 140 may confirm the safety of the counterpart device and perform the certification process before the full-scale communication. In order to confirm the safety of the counterpart device, the attestation mechanism of the Trusted Computing Group (TCG) standard can be used. However, this method is merely exemplary, and other methods can be used to confirm the safety of the counterpart device. Further, the certification process can be performed without the safety-confirming process of the counterpart device. An example of the certification process is described in FIG. 2.

Figure 2:
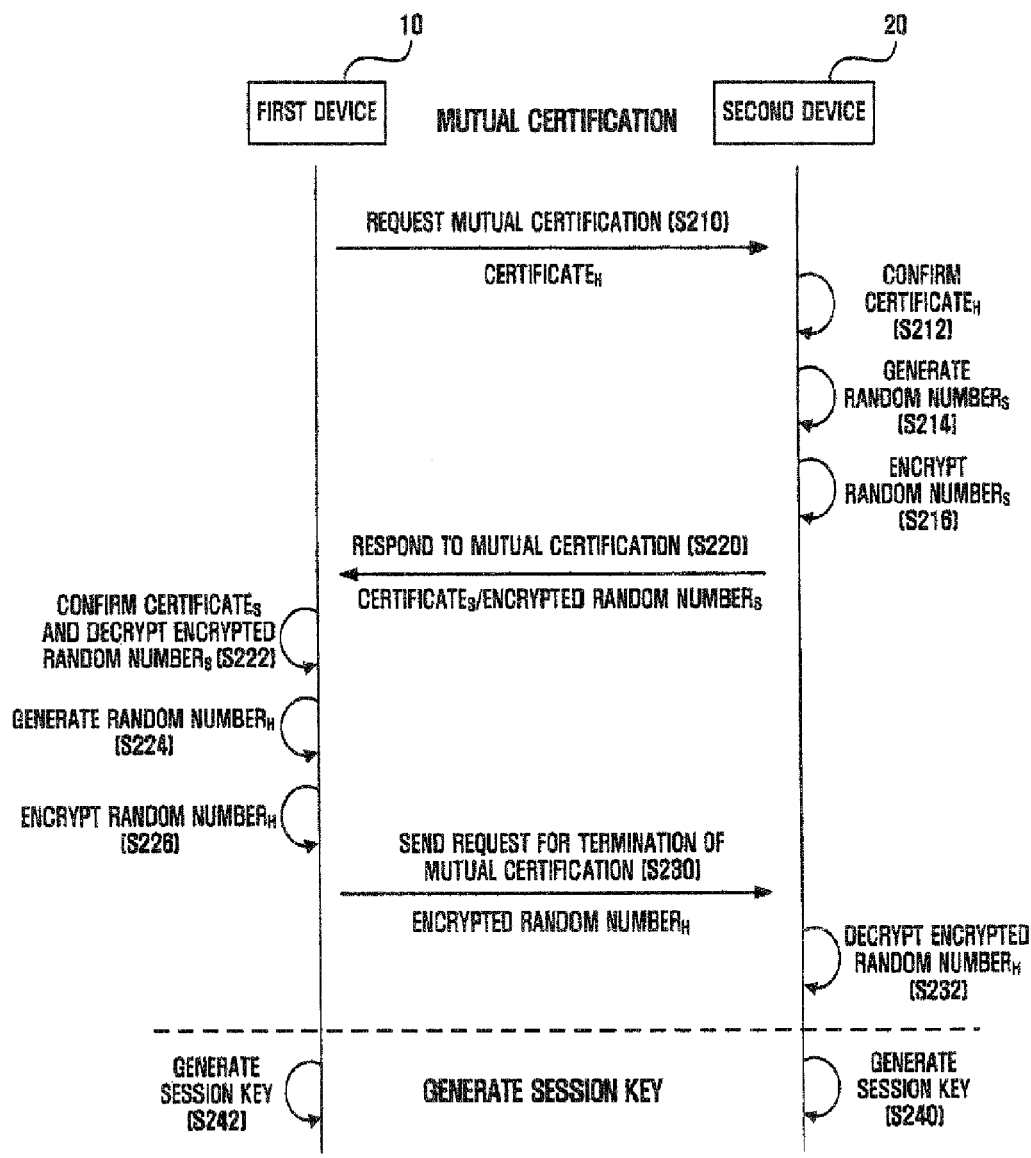
FIG. 2 is a flowchart illustrating a mutual authentication process according to an exemplary embodiment of the present invention.

FIG. 2 is a flowchart illustrating the mutual certification process according to an exemplary embodiment of the present invention. In the present embodiment, the subscript "1" represents data belonging to or generated by a first device 10, and the subscript "2" represents data belonging to or generated by a second device 20. Further, the first device 10 and the second device 20 can be one of the main device 110, the remote device 120, the service-providing device 130, and the content-providing server 140, respectively.

First, if the first device 10 is connected to the second device 20, the first device 10 sends a request for mutual certification to the second device 20. Here, the first device 10 can transmit certificate, issued for the first device 10 by the certification authority. Certificate$_1$ includes ID$_1$ and public key$_1$ of the first device 10, and is electronically signed by the certification authority.

The second device 20 receiving certificate$_1$ of the first device 10 confirms whether certificate$_1$ is valid using the certification revocation list (CRL) (S212). If certificate$_1$ of the first device 10 is registered in the CRL, the second device 20 can reject mutual certification with the first device 10. However, if certificate$_1$ of the first device 10 is not registered in the CRL, the second device 20 can obtain public key$_1$ of the first device 10.

If it is determined whether the first device 10 is valid, the second device 20 generates random number$_2$ (S214), and encrypts the generated random number$_2$ as public key$_1$ of the first device 10 (S216).

Then, the second device 20 performs a mutual-certification response (S220). For this, the second device 20 can transmit certificate$_2$ issued for the second device 20 by the certification authority and the encrypted random number$_2$ together. Certificate$_2$ includes ID$_2$ and public key$_2$ of the second device 20, and is electronically signed by the certification authority.

The first device 10 receiving certificates and the encrypted random number$_2$ from the second device 20 confirms that the second device 20 is valid through certification$_2$, and decrypts the encrypted random number$_2$ as private key$_1$ of the first device 10 (S222). Here, the first device 10 can obtain public key$_2$ of the second device 20 through certificate of the second device 20. Further, the confirmation on certificate$_2$ can be performed through the CRL as in the second device 20.

If it is determined that the second device 20 is valid through certificate$_2$ confirmation, the first device 10 generates random number$_1$ (S224), and encrypts generated random number, as public key$_2$ of the second device 20 (S226).

Then, the first device 10 sends a request for termination of mutual certification and encrypted random number$_1$ to the second device 20 (S230).

The second device 20 receiving encrypted random number$_1$ from the first device 10 decrypts random number$_1$ encrypted by its private key$_2$ (S232).

As such, the first device 10 and the second device 20 share the two random numbers (random number$_1$ and random number$_2$).

As a result, the first device 10 and the second device 20 sharing the two random numbers generate a session key using the two random numbers (S240 and 242). Here, the key-generation algorithms used by the first device 10 and the second device to generate a session key are the same. Hence, the first device 10 and the second device 20 can share the same session key.

The first device 10 and the second device 20 encrypt data to be transmitted to the counterpart after mutual certification using the session key, and the encrypted data received from the counterpart can be decrypted using the session key. As such, security can be maintained in data transmission between the first device 10 and the second device 20.

Further, the flowchart of FIG. 2 includes the random-number-exchange process for generation of the session key, and the session-key-generation process, but both processes can be omitted if the session-key generation is not necessary. That is, in the case where only the validity of the counterpart device needs to be confirmed, the mutual certification process can be completed by verifying the certificate transmitted from the counterpart device.

Figure 3:
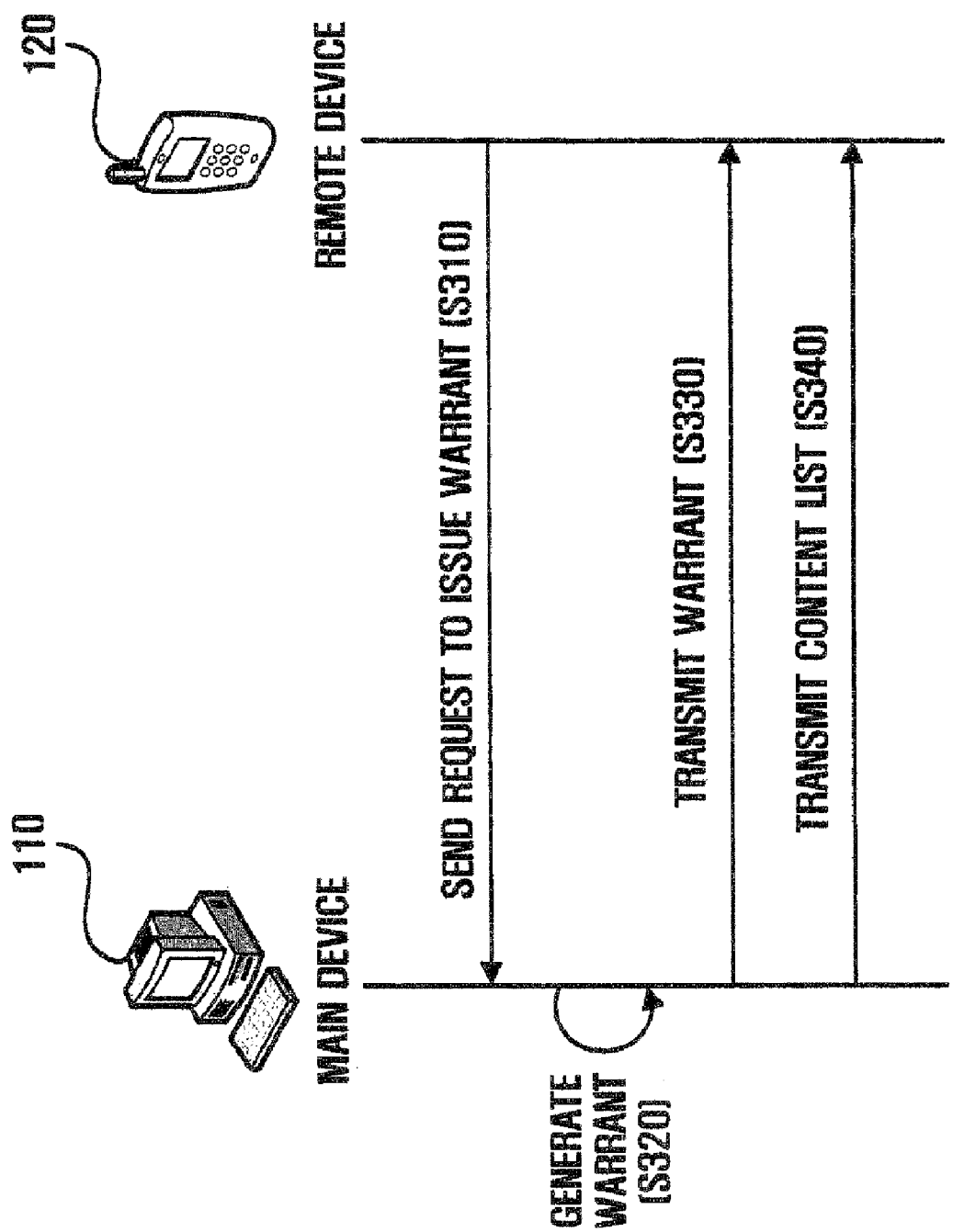
FIG. 3 is a flowchart illustrating the process where a main device issues a warrant to a remote device according to an exemplary embodiment of the present invention.

FIG. 3 is a flowchart illustrating a process where the main device 110 issues a warrant to the remote device 120 according to an exemplary embodiment of the present invention.

First, the remote device 120 sends a request for the issuance of a warrant to the main device 110 (S310). When the warrant issuance is requested, the main device 110 can verify the safety of the remote device 120, and for this, the attestation mechanism of the TCG standard or the mutual certification process can be performed. Hence, the remote device 120 can transmit its identifier (e.g., a MAC address) or the certificate to the main device when sending a request for the warrant issuance. The safety confirmation can be performed before requesting the warrant issuance.

If it is recognized that the remote device 120 is safe, the main device 110 generates a warrant to issue to the remote device 120 (S320). The warrant may include information of the issuer and the recipient. The warrant can include the identifier of the remote device 120 and the identifier of the main device 110. As another example, the warrant can include the public key of the remote device 120 and the public key of the main device 110. The generated warrant may be encrypted by the private key of the main device 110 so that the third device can confirm that the warrant has been generated by the main device 110.

The warrant issuance means that the main device 110 distributes all or some of its replay rights to the remote device 120. If the main device intends to allocate only some of its replay rights to the remote device 120, the main device 110 can include information of the restricted authority in the certificate. Hereinafter, the information for the limited right included in the warrant is called "use-limit information" in order to distinguish it from the aforementioned constraint information.

For example, if the main device 110 has the right to replay content 10 times, and allows the remote device 120 to replay content twice, the main device 110 can generate a certificate including use-limit information indicating that content can be replayed twice.

The range of the use-limit information included in the warrant can be allocated according to the request of the remote device 120, or can be allocated by the main device without the request of the remote device 120.

If the warrant is generated, the main device 110 transmits the warrant to the remote device 120 (S330).

Then, the main device 110 transmits the list of content (hereinafter called a "content list") that can be replayed using the warrant to the remote device 120 (S340). The content list can include detailed information of content such as a content identifier and a content type (e.g., video, music, game, or image). The content list can include information on all of the content, or information on part of the content. Further, the content list can be written in advance or when the warrant it issued.

The remote device 120 receives the warrant issued by the main device 110, and can replay content after a predetermined procedure, which is described with reference to FIG. 4 in the following.

Figure 4:
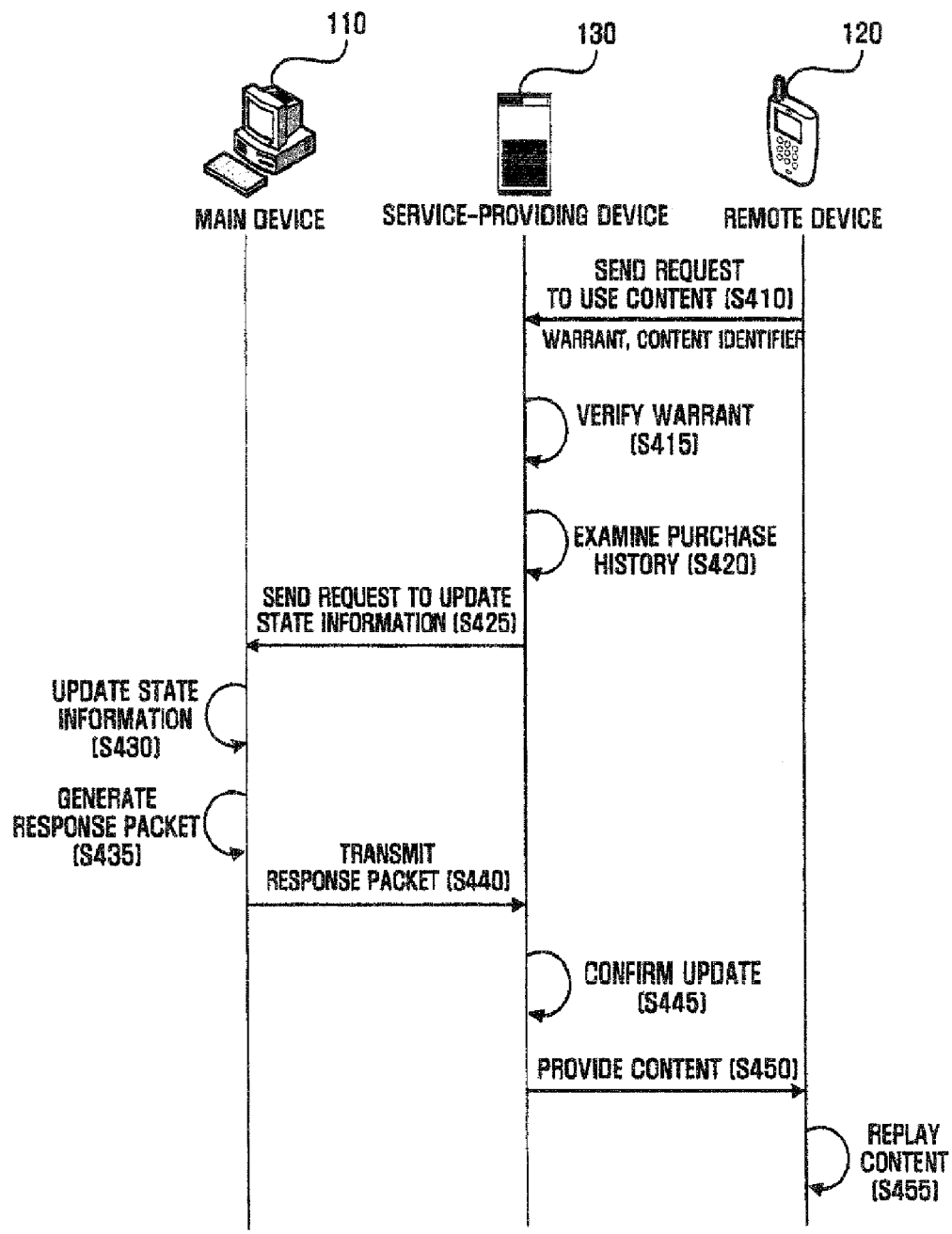
FIG. 4 is a flowchart illustrating a content-replay process of a remote device according to an exemplary embodiment of the present invention.

FIG. 4 is a flowchart illustrating a content-replay process of the remote device 102 according to an exemplary embodiment of the present invention.

The remote device 120 receives the warrant issued by the main device 110, and sends a request for the use of content to the service-providing device 130 (S410). Here, the remote device 120 can transmit the warrant issued from the main device 110 and the information about content to be used (e.g., the content identifier). The information of content to be used can be selected among the content list transmitted from the main device 110.

When the request for the use of content is received from the remote device 120, the service-providing device 130 verifies the warrant transmitted along with the request (S415). Because the warrant is encrypted by the private key of the main device 110, if the encrypted warrant can be decrypted using the public key of the main device 110, it can be confirmed that the warrant has been issued by the main device 110. The public key of the main device 110 can be provided by the certification authority, or can be directly provided by the main device 110. Further, the certificate of the main device 110 can be transmitted from the remote device 120 along with the request for the use of content. Here, the service-providing device 130 can obtain the public key of the main device 110 through the certificate of the main device 110. Further, the public key of the main device can be obtained through various other methods. Further, if other information is necessary to verify the warrant, the information can be obtained from the main device 110, the remote device 120, or other devices.

Though not illustrated, if the warrant transmitted by the remote device 120 is not valid, the service-providing device 130 can inform the remote device 120 of the fact that content cannot be provided.

However, if it is verified that the warrant is valid, the service-providing device 130 examines the purchasing history of the main device 110 (S420). The purchasing history can include information of ROs and content purchased from the content-providing server 140. By examining the purchasing history, the service-providing device 130 can confirm that the main device 110 has the right to replay the content requested by the remote device 120.

The purchasing history of the main device 110 can be obtained from the content-providing server 140. Further, whenever the main device 110 purchases an RO or content from the content-providing server 140, if the content-providing server 140 transmits the purchasing record to the service-providing device 130, the service-providing device 130 can generate and manage the purchasing history of the main device 110.

If the replay right of the main device on content requested by the remote device 120 is confirmed, the service-providing device 130 sends a request for the update of state information of the RO to the main device 110 (S425). Here, the service-providing device 130 can provide information one the content requested by the remote device (e.g., the content identifier) to the main device 110.

In (S425), the update level of the state information can correspond to the use-limit information included in the warrant transmitted by the remote device 120. For example, if the use-limit information indicates that content can be replayed 2 times, the service-providing device 130 can send a request to count the state information of the RO corresponding to the content 2 times to the main device 110.

According to an exemplary embodiment of the present invention, the update level of the state information requested in (S425) can be determined by the remote device 120. For example, the remote device 120 can send information of the amount of content used when the use of content is requested in (S410). Here, the service-providing device 130 determines whether information on the amount of content used is within the use limit information included in the warrant, and, if so, sends a request to update the state information as much as the amount of content used, which is requested by the remote device 120 in (S425), to the main device 110. For example, if the remote device 120 sends a request to use content 1 time, the service-providing device 130 can send a request to count the state information on the constraint of the number of times one time in the RO of the content.

Referring to FIG. 4, the main device 110 updates the state information of the RO according to the request of the service-providing device 130 (S430). The RO, whose state information needs to be updated, can be retrieved through the information of content received along with the request for the state-information update. According to an exemplary embodiment of the present invention, the main device 110 can send a request for a warrant to the service-providing device 130 before updating the state information. Here, the service-providing device 130 transmits the warrant transmitted by the remote device 120 to the main device 110, and the main device 110 restores the warrant as the public key, whereby it is confirmed that the request for the state-information update of the service-providing device 130 is valid.

After updating the state information, the main device 110 generates a response packet to confirm the update of the state information (S435), and transmits the generated response packet to the service-providing device 130 (S440). Here, the response packet can include the state information before the update and the updated state information, and can be encrypted as the public key of the main device 110. In the case where the request for the state-information update received from the service-providing device 130 exceeds the allowed range of the state information of the main device 110, a rejection such as "Content cannot be used" can be included in the response packet. For example, the remote device 120 can send a request to replay content 5 times to the service-providing device 130, and the service-providing device 130 can then send a request to update the state information to the main device 110. Here, if the replay right of the content of the main device 110 is 4 times, because the range of the requested state-information update is larger than the range of the right that can be allowed by the main device, the main device 110 generates a response packet including sentences such as "This is a request beyond the rights limit", and transmits the response packet to the service-providing device 130.

The service-providing device 130 confirms that the state information has been updated through the response packet received from the main device 110 (S445). For example, in the case where the response packet is decrypted by the public key of the main device 110, and the response packet indicates that the state information has been updated, the service-providing device 130 can determine that the state information has been successfully updated.

If the state information has been updated, the service-providing device 130 can provide content to the remote device 120 (S450). The content can be provided in a streaming or downloading manner. In the case of downloading, the critical value limiting the replay of the content can be transmitted along with the content. Here, whenever the remote device 120 replays content, the critical value is updated. For example, if the critical value is set to 2, because the critical value is counted when replaying content, the remote device 120 can replay content a total of 2 times. The critical value corresponds to the update level of the state information in (S430).

Further, in (S450), the transmitted content can be encrypted using information shared by the remote device 120 and the service-providing device 130. For example, the service-providing device 130 can encrypt content using the identifier of the unique public key or the identifier of the remote device 120. If the mutual certification process has been performed in advance, as illustrated in FIG. 2, the service-providing device 130 can encrypt content using the session key generated as a result of the mutual certification. The content encryption prevents content from being used by the device, exempting the remote device 120.

The remote device 120 that receives content from the service-providing device 130 can replay the content (S455).

Figure 5:
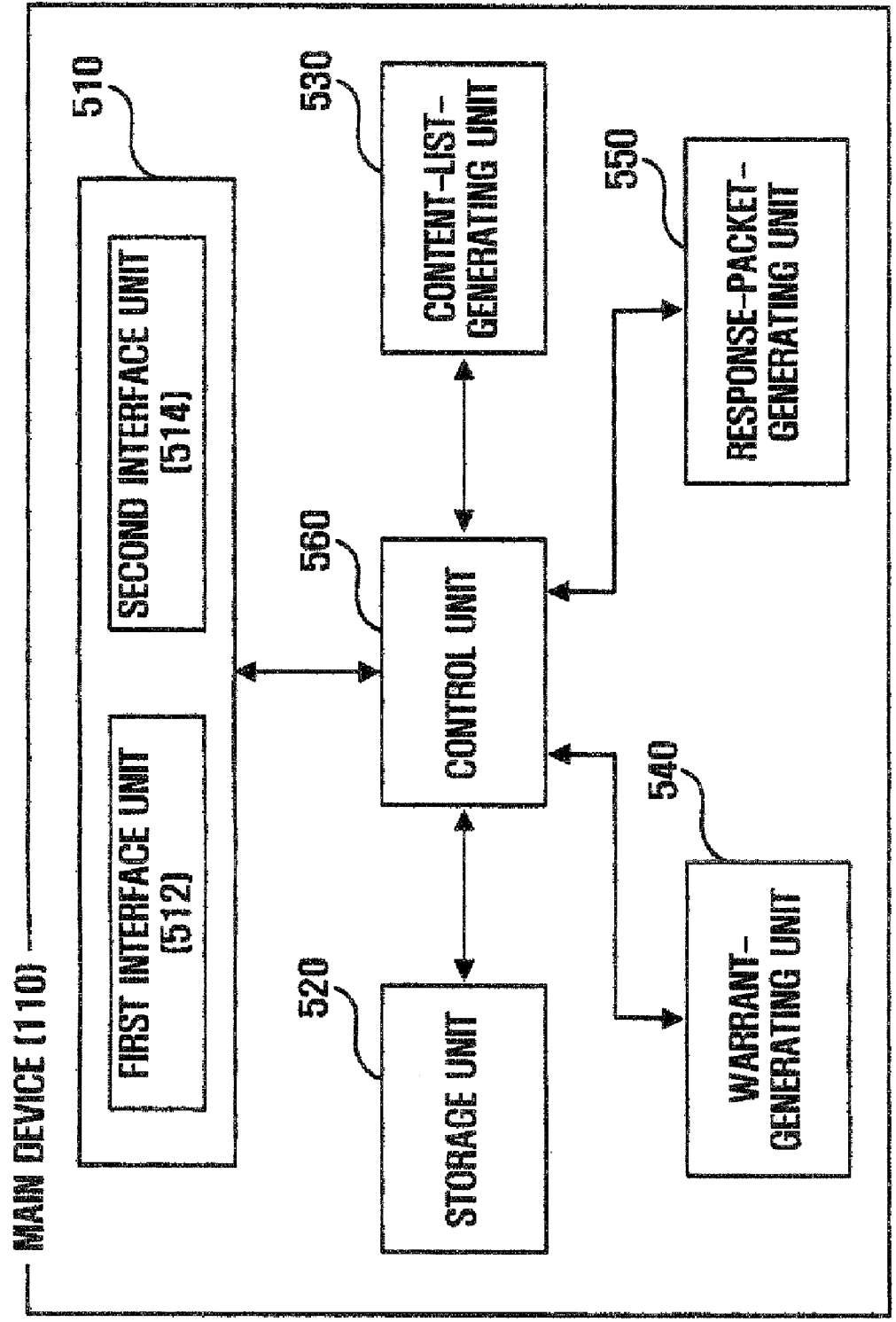
FIG. 5 is a block diagram illustrating a main device according to an exemplary embodiment of the present invention.

FIG. 5 is a block diagram illustrating the main device according to an exemplary embodiment of the present invention. The main device 110 includes a communication unit 510, a storage unit 520, a content-list-generating unit 530, a warrant-generating unit 540, a response-packet-generating unit 550, and a control unit 560.

The communication unit 510 transmits and receives external devices and data through a wired or wireless medium. Specifically, the communication unit 510 can include a first interface unit 512 and a second interface unit 514. The first interface unit 512 can perform LAN communication using communication protocols such as infrared communication, Bluetooth, wireless LAN, USB and IEEE 1394, and the second interface unit 514 can perform WAN communication using communication protocols based on xDSL, a optical cable and a telephone line. The first interface unit 512 may be used for the communication with the remote device 120, and the second interface unit 514 may be used for the communication with the content-providing server 140 or the service-providing device 130.

The storage unit 520 includes storage media such as a hard disk drive or a flash memory, and content or an RO. Data requiring strong security such as ROs or content may be stored in a secure storage area, which is logically or physically separated from the storage area in which generated data is stored. The access to the storage area is possible by the control unit 560, and the access by an external device or the third module may be blocked.

The content-list-generating unit 530 writes the aforementioned content list. The content list can be written when the request for the warrant is received from the remote device 120, or can be updated whenever necessary depending on the change of the replay right such as when a new RO is stored in the storage unit 520 and when the RO stored in the storage unit 520 is deleted.

The warrant-generating unit 540 generates a warrant to be provided to the remote device 120.

The response-packet-generating unit 550 generates a response packet including information that can confirm the situation where the state information is updated according to the request of the service-providing device 130. For example, the response packet can include the state information before and after the update.

The control unit 560 controls the operation of each of the elements constituting the main device 110. Further, the control unit 560 maintains the security of the main device 110, and can function as a DRM manager. For example, the control unit 560 updates the state information of the RO, performs various encryption and decryption processes, and controls the security-checking process of the counterpart device when communicating with other devices.

Figure 6:
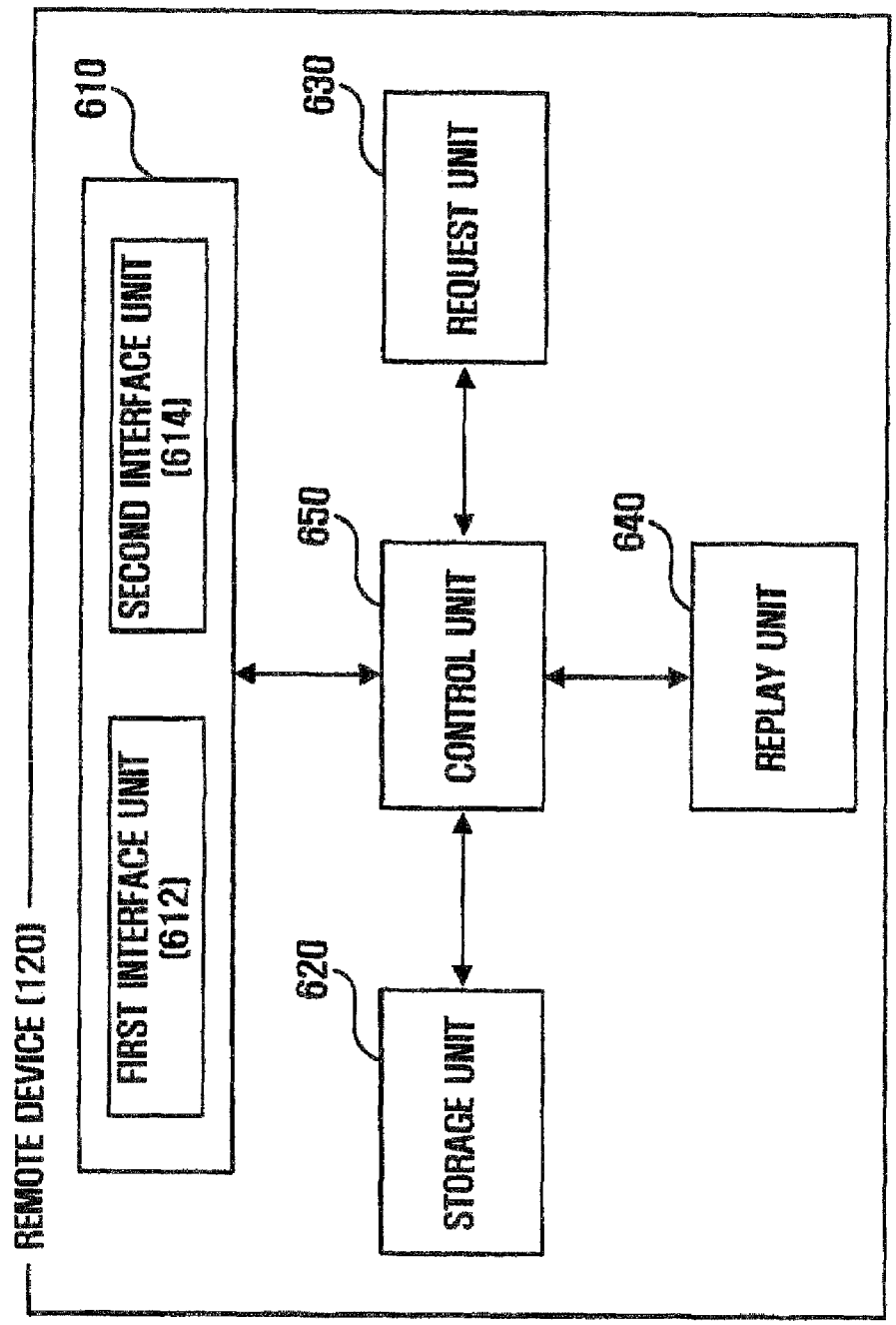
FIG. 6 is a block diagram illustrating a remote device according to an exemplary embodiment of the present invention.

FIG. 6 is a block diagram illustrating the remote device 120 according to an exemplary embodiment of the present invention. The remote device 120 includes a communication unit 610, a storage unit 620, a warrant-issuance-requesting unit 630, a replay unit 640, and a control unit 650.

The communication unit 610 transmits and receives information on external devices and data through wired or wireless media. The structure of the communication unit 610 is similar to that of the communication unit 510 of the main device 110 described with reference to FIG. 5. A first interface unit 612 may be used for communication with the main device 110, and a second interface unit 614 may be used for communication with the service-providing device 130.

The storage unit 620 includes storage media such a hard disk drive or a flash memory, and can store a warrant transmitted from the main device 110 or content transmitted from the service-providing device 130. The storage unit 620 may be logically or physically protected from the access by an external device or the third module, and data is stored, deleted, changed, or retrieved according to the control of the control unit 650.

The warrant-issuance-requesting unit 630 manages the request for the warrant issuance and content. For this, the warrant-issuance-requesting unit 630 generates a warrant-issuance-request packet and a content-request packet, and handles the packet or the information received in response to the request.

The replay unit 640 replays content provided from the service-providing device 130. For example, the replay unit 640 includes the MPEG decoder, and can replay videos.

The control unit 650 controls the operation of each of the elements constituting the remote device 120. Further, the control unit 650 maintains the security of the remote device 120, and functions as a DRM manager. For example, the control unit 560 performs various types of encryption and decryption, and controls the security-checking process of the counterpart device when communicating with other devices. Further, if a critical value limiting the replay of content provided from the service-providing device 130 is set, the control unit 650 controls the replay unit 640 so that it can replay content within the range of the critical value.

Figure 7:
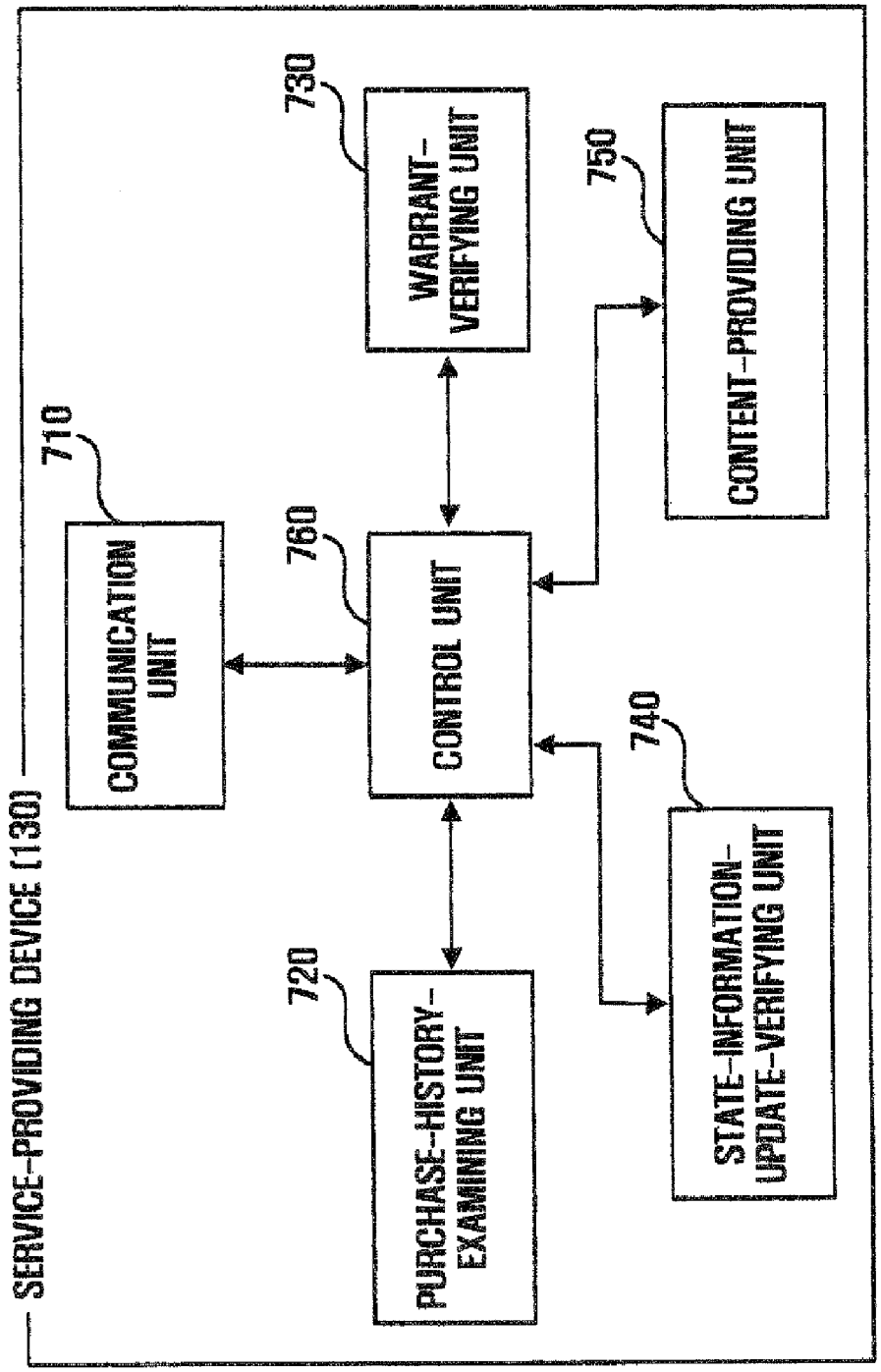
FIG. 7 is a block diagram illustrating a service-providing device according to an exemplary embodiment of the present invention.

FIG. 7 is a block diagram illustrating the service-providing device 130 according to an exemplary embodiment of the present invention. The service-providing device 130 includes a communication unit 710, a purchase-history-examining unit 720, a warrant-verifying unit 730, a state-information-update-verifying unit 740, a content-providing unit 750, and a control unit 760.

The communication unit 710 transmits and receives external devices and data through a wired or wireless medium. For example, the communication unit 710 can communicate with the main device 110, the remote device 120, and a content-providing server 140 using a communication protocol based on xDSL, an optical cable, a telephone line, or others.

The purchase-history-examining unit 720 examines the purchase history of the main device 110. For this, the purchase-history-examining unit 720 sends a request for the purchase history of the main device 110, and receives the purchase history of the main device 110 provided from the content-providing server in response to the request. According to an exemplary embodiment of the present invention, the purchase-history-examining unit 720 can directly manage the purchase history of the main device 110 by receiving content or the RO-purchase history of the main device 110 periodically or non-periodically provided by the content server 140.

The warrant-verifying unit 730 verifies that the warrant transmitted from the remote device 120 is valid. For example, in the case where the warrant is decrypted using the public key of the main device 110, the warrant-verifying unit 730 determines that the warrant is valid.

In the case where the state-information-update-verifying unit 740 receives a request for content transmission from the remote device 120, it sends a request to update the state information of the RO corresponding to the content to the main device 110, and then examines whether the state information is normally updated through the response packet transmitted from the main device 110.

The content-providing unit 750 provides content request by the remote device 120 to the remote device 120. The content can be provided by the streaming or downloading. The same processes described in FIG. 4 will be performed until content is provided to the remote device 120, and content can be provided when each of the processes is successfully performed. In order to appropriately provide necessary content, the content-providing unit 750 can be linked to the content-providing server 140, and can provide content of the content-providing server 140 to the remote device 120. The content-providing unit 750 manages a separate database storing content, retrieves content necessary for the database, and provides the retrieved content to the remote device 120.

The control unit 760 controls the operation of each of the elements constituting the service-providing device 130. Further, the control unit 760 maintains the security of the service-providing device 130, and functions as a DRM manager. For example, the control unit 760 performs various types of encryption and decryption, and controls the safety-checking process of the counterpart device. Further, the control unit 760 can include the critical value limiting the replay of content to be provided to the remote device 120.

Each of the elements constituting the main device 110, the remote device 120, and the service-providing device 130 described here can be implemented as a module. The term "module", as used herein, means, but is not limited to, a software or hardware component, such as a Field Programmable Gate Array (FPGA) or an Application Specific Integrated Circuit (ASIC), which performs certain tasks. A module may be configured to reside in the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The operation between elements constituting the main device 110, the remote device 120, and the service-providing device 130 described with reference to FIGS. 5 to 7 can be understood through FIGS. 1 to 4.

It should be understood by those of ordinary skill in the art that various replacements, modifications and changes may be made in the form and details without departing from the spirit and scope of the present invention as defined by the following claims. Therefore, it is to be appreciated that the above described embodiments are for purposes of illustration only and are not to be construed as limitations of the invention.

According to the method and apparatus of the present invention, content can be flexibly used regardless of the device while protecting digital rights.

What is claimed is:

1. A method of managing digital rights of a remote device, the method comprising:
    receiving a warrant including information indicating that use of a content is allowed, issued from a main device having a replay right for the content;
    transmitting the warrant to a service-providing device;
    determining that state information has been successfully updated by checking the response packet indicating that the state information has been updated;
    receiving the content from the service-providing device, if the state information has been updated properly, and
    receiving a list of contents that can be replayed using the warrant from the main device, wherein the content provided from the service-providing device is selected by the remote device from the list
    wherein the service providing device provides information of the content utilized by the remote device, to the main device, and requests the main device to update the state information based on the utilized content.

2. The method of claim 1, wherein the warrant includes at least one of information of the main device and information of the remote device.

3. The method of claim 2, wherein the information of the main device includes at least one of an identifier and a public key of the main device, and the information of the remote device includes at least one of an identifier and a public key of the remote device.

4. The method of claim 1, wherein the warrant includes use-limit information of the content.

5. The method of claim 1, wherein the warrant is encrypted by a private key of the main device.

6. The method of claim 1, wherein the content provided from the service-providing device includes a critical value restricting replay of the content.

7. The method of claim 1, wherein the content provided from the service-providing device is encrypted through information shared between the service-providing device and the remote device.

8. The method of claim 7, wherein the shared information includes at least one of an identifier and a public key of the remote device.

9. A method of managing digital rights of a main device having a replay right of a content, the method comprising:
    issuing to a remote device a warrant including information indicating that use of a content is allowed;
    receiving a request to update state information of a rights object for replaying the content, from a service-providing device intending to provide the content to the remote device; and
    updating the state information,
    wherein the service providing device provides information of the content utilized by the remote device, to the main device, and requests the main device to update the state information based on the utilized content.

10. The method of claim 9, further comprising:
    transmitting to the remote device a list of contents that can be replayed using the warrant.

11. The method of claim 9, further comprising:
    transmitting to the service-providing device a response packet including information indicating that the state information has been updated.

12. The method of claim 11, wherein the response packet is encrypted using a private key of the main device.

13. The method of claim 9, further comprising:
    receiving from the service-providing device the warrant obtained by the service-providing device from the remote device,
    wherein the updating of the state information is performed if the warrant has been issued by the main device.

14. The method of claim 9, wherein the warrant is encrypted using a private key of the main device.

15. The method of claim 9, wherein the warrant includes at least one of information of the main device and information of the remote device.

16. The method of claim 9, wherein the warrant includes use-limit information of the content.

17. A method of managing digital rights of a service-providing device, the method comprising:
    receiving a warrant and a request for content transmission from a remote device;
    determining whether the warrant is issued by a main device;
    confirming that the main device has the right to replay the content requested by the remote device by examining the purchasing history of the main device;
    providing a content to the remote device if the warrant is issued by the main device, and
    providing a list of contents that can be replayed using the warrant from the main device, wherein the content provided from the service-providing device is selected by the remote device from the list
    wherein the service providing device provides information of the content utilized by the remote device, to the main device, and requests the main device to update state information based on the utilized content.

18. The method of claim 17, further comprising:
    examining purchase history of the main device,
    wherein the providing is performed if it is determined that the main device has purchased the content or a rights object corresponding to the content.

19. The method of claim 17, further comprising:
    sending to the main device a request to update state information of a rights object for replaying the content; and
    receiving from the main device a response packet including information indicating that the state information has been updated,
    wherein the providing is performed if it is determined that the state information has been updated through the response packet.

20. The method of claim 17, wherein the content provided to the remote device is encrypted by information shared between the service-providing device and the remote device.

21. The method of claim 20, wherein the shared information includes at least one of an identifier and a public key of the remote device.

22. The method of claim 17, wherein the providing includes providing a critical value restricting replay of the content provided to the remote device.

23. A remote device for managing digital rights, the device comprising:
a request unit that sends a request for content to a service-providing device using a warrant including information indicating that use of a content is allowed from a main device having a replay right of the content;
determining that state information has been successfully updated by checking the response packet indicating that the state information has been updated;
replaying the content provided from the service-providing device, if the state information has been updated properly; and
receiving a list of contents that can be replayed using the warrant from the main device, wherein the content provided from the service-providing device is selected by the remote device from the list,
wherein the service providing device provides information of the content utilized by the remote device, to the main device, and requests the main device to update the state information based on the utilized content.

24. The device of claim 23, wherein the warrant includes at least one of information of the main device and information of the remote device.

25. The device of claim 24, wherein the information of the main device includes at least one of an identifier and a public key of the main device, and the information of the remote device includes at least one of an identifier and a public key of the remote device.

26. The device of claim 23, wherein the warrant includes use-limit information of the content.

27. The device of claim 23, wherein the warrant is encrypted using a private key of the main device.

28. The device of claim 23, wherein the content provided from the service-providing device includes a critical value restricting replay of the content.

29. The device of claim 23, wherein the content provided from the service-providing device is encrypted through information shared between the remote device and the service-providing device.

30. The device of claim 29, wherein the shared information includes at least one of an identifier and a public key of the remote device.

31. A main device having the content replay right, the device comprising:
a warrant-generating unit that generates a warrant including information indicating that use of a content is allowed;
a communication unit that transmits the generated warrant to a remote device; and
a control unit that updates state information after receiving a request to update the state information of a rights object that can replay the content, from a service-providing device intending to provide the content to the remote device,
wherein the service providing device provides information of the content utilized by the remote device, to the main device, and requests the main device to update the state information based on the utilized content.

32. The device of claim 31, further comprising:
a content-list-generating unit that generates a list of contents that can be replayed using the warrant,
wherein the communication unit transmits the generated list to the remote device.

33. The device of claim 31, further comprising
a response-packet-generating unit that generates a response packet to be transmitted to the service-providing device, the response packet comprising information indicating that the state information has been updated.

34. The device of claim 33, wherein the response packet is encrypted by the control unit using a private key of the main device.

35. The device of claim 31, wherein the control unit updates the state information if the warrant transmitted to the remote device is received from the service-providing device.

36. The device of claim 31, wherein the warrant is encrypted using a private key of the main device.

37. The device of claim 31, wherein the warrant includes at least one of information of the main device and information of the remote device.

38. The device of claim 31, wherein the warrant includes use-limit information of the content.

39. A service-providing device for managing digital rights, the device comprising:
a warrant-verifying unit that verifies whether a warrant has been issued by a main device if a request for transmission of the warrant and content is received from a remote device;
a purchase-history-examining unit that confirms that the main device has the right to replay the content requested by the remote device by examining the purchasing history of the main device; and
a content-providing unit that provides the content to the remote device if the warrant has been issued by the main device, and provides a list of contents that can be replayed using the warrant from the main device, wherein the content provided from the service-providing device is selected by the remote device from the list,
wherein the service providing device provides information of the content utilized by the remote device, to the main device, and requests the main device to update state information based on the utilized content.

40. The device of claim 39, further comprising:
a purchase-history-examining unit that examines purchase history of the main device,
wherein the content-providing unit provides the content to the remote device if it is confirmed that the main device has purchased the content or a rights object corresponding to the content.

41. The device of claim 39, further comprising:
A response-packet-verifying unit that sends a request for update of state information of a rights object for replaying the content, to the main device, and verifies that the state information has been updated through a response packet if the response packet includes information indicating that the state information has been updated,
wherein the content-providing unit provides the content if the state information is updated.

42. The device of claim 39, further comprising:
a control unit that encrypts the content provided to the remote device using information shared between the service-providing device and the remote device.

43. The device of claim 42, wherein the shared information includes at least one of an identifier and a public key of the remote device.

44. The device of claim 39, wherein the control unit includes a critical value restricting replay of the content provided to the remote device.

* * * * *